US012593384B2

(12) United States Patent
Chou et al.

(10) Patent No.: US 12,593,384 B2
(45) Date of Patent: Mar. 31, 2026

(54) LED DRIVER AND OPERATING METHOD THEREOF

(71) Applicant: DELTA ELECTRONICS, INC., Taoyuan City (TW)

(72) Inventors: Ching-Ho Chou, Taoyuan City (TW); Yung-Chuan Lu, Taoyuan City (TW); Ming-Lung Hsieh, Taoyuan City (TW); Chia-Chang Hsu, Taoyuan City (TW); Ming-Wei Chou, Taoyuan City (TW); Sheng-Jian Chen, Taoyuan City (TW); Cheng-Chieh Ou, Taoyuan City (TW); Wei-Chieh Chao, Taoyuan City (TW); Yang-Sheng Sun, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 57 days.

(21) Appl. No.: 18/812,548

(22) Filed: Aug. 22, 2024

(65) Prior Publication Data

US 2025/0386409 A1 Dec. 18, 2025

(30) Foreign Application Priority Data

Jun. 18, 2024 (CN) ........................ 202410784739.X

(51) Int. Cl.
*H05B 45/3725* (2020.01)

(52) U.S. Cl.
CPC ................................ *H05B 45/3725* (2020.01)

(58) Field of Classification Search
CPC .................................................. H05B 45/3725
See application file for complete search history.

(56) References Cited

U.S. PATENT DOCUMENTS 7,759,881 B1 * 7/2010 Melanson .......... H05B 45/3725 315/293
8,018,171 B1 * 9/2011 Melanson .......... H05B 45/3725 315/195
8,212,493 B2 * 7/2012 Melanson ........... H02M 3/3374 363/16

(Continued)

FOREIGN PATENT DOCUMENTS

TW 200643853 A 12/2006
TW 201444401 A 11/2014

OTHER PUBLICATIONS

Office Action dated Jan. 24, 2025 of the corresponding Taiwan patent application No. 113122467.

*Primary Examiner* — Adam D Houston
(74) *Attorney, Agent, or Firm* — MUNCY, GEISSLER, OLDS & LOWE, P.C.

(57) ABSTRACT

An LED driver is couple to a first LED module and a second LED module, and the LED driver includes a first power conversion module, a switch, a second power conversion module, and a control module. The control module controls the switch to conduct so as to provide a second DC voltage and a third DC voltage outputted by the first power conversion module to the first LED module. The control module controls the switch not to conduct, and controls the second power conversion module to provide a fourth DC voltage, a fifth DC voltage, and a sixth DC voltage according to the second DC voltage for providing the fourth DC voltage, the fifth DC voltage, and the sixth DC voltage to the second LED module.

13 Claims, 7 Drawing Sheets

(56) References Cited

U.S. PATENT DOCUMENTS

| | | | | |
|---|---|---|---|---|
| 8,344,707 | B2 * | 1/2013 | Melanson | G05F 1/70 323/222 |
| 8,434,882 | B2 * | 5/2013 | Tian | F21K 9/278 362/183 |
| 8,487,546 | B2 * | 7/2013 | Melanson | H05B 45/327 315/297 |
| 8,508,154 | B2 | 8/2013 | Chou et al. | |
| 9,313,840 | B2 * | 4/2016 | Grisamore | H02M 3/33523 |
| 9,510,401 | B1 * | 11/2016 | Kost | H05B 45/3725 |
| 9,520,794 | B2 * | 12/2016 | Maru | H02M 3/33523 |
| 9,681,512 | B1 * | 6/2017 | Xiong | H05B 47/18 |
| 2006/0274024 | A1 | 12/2006 | Wey et al. | |
| 2010/0194308 | A1 * | 8/2010 | Zhao | H05B 45/38 315/297 |
| 2013/0285564 | A1 | 10/2013 | Van De Ven et al. | |
| 2014/0327366 | A1 | 11/2014 | Wu | |
| 2015/0271893 | A1 * | 9/2015 | Lee | G09G 3/36 315/186 |
| 2016/0262226 | A1 * | 9/2016 | Kangyo | H05B 45/3725 |
| 2018/0132313 | A1 * | 5/2018 | Kuang | H05B 45/3725 |
| 2018/0295689 | A1 * | 10/2018 | Bandel | F21V 23/004 |
| 2021/0384760 | A1 | 12/2021 | Hsia | |
| 2022/0240356 | A1 * | 7/2022 | Lee | H05B 45/325 |
| 2023/0239978 | A1 | 7/2023 | Chitta et al. | |
| 2025/0089140 | A1 * | 3/2025 | Wu | H05B 45/50 |
| 2025/0183704 | A1 * | 6/2025 | Altenburger | F21V 23/02 |

* cited by examiner

LED DRIVER AND OPERATING METHOD THEREOF

CROSS-REFERENCE TO RELATED APPLICATION

This patent application claims the benefit of China patent application No. CN202410784739.X filed Jun. 18, 2024, the entirety of which is incorporated by reference herein.

BACKGROUND

Technical Field

The present disclosure relates to an LED driver and an operating method thereof, and more particularly to the LED driver and the operating method that can increase power conversion efficiency.

Description of Related Art

The statements in this section merely provide background information related to the present disclosure and do not necessarily constitute prior art.

In recent years, high-power light-emitting diode (LED) floodlights have been widely used in various lighting applications, such as sports fields and stages, etc., which can significantly reduce energy consumption and have replaced traditional high-intensity discharge gas (HID) floodlights. LED has functions such as easy temperature adjustment (color temperature adjustment of white and yellow LEDs) and color-mixing control (color-mixing control of red, green, and blue LEDs). Therefore, functions such as temperature adjustment and color-mixing control can be achieved through integrated white, yellow, red, green, and blue LED light assemblies.

LED lights for lighting require higher voltages while LED lights for color mixing may require lower voltages. The voltage range required for hybrid LED lamps that integrate lighting and color-mixing functions is too wide, thereby making it difficult for hybrid LED lamp drivers to operate with high power conversion efficiency in both working modes. Not only does it waste a lot of energy, but the corresponding heat also causes difficulties in heat dissipation design, and may even cause safety concerns.

Therefore, how to design an LED driver and a method of operating the same to increase its power conversion efficiency in two working modes has become a critical topic in this field.

SUMMARY

In order to solve the above-mentioned problems, the present disclosure provides an LED driver. The LED driver is to be coupled to a first LED module and a second LED module. The LED driver includes a first power conversion module, a switch, a second power conversion module, and a control module. The first power conversion module converts a first DC voltage into a second DC voltage and a third DC voltage. The switch is coupled to the first power conversion module, and is to be coupled to the first LED module. The second power conversion module is coupled to the first power conversion module, and is to be coupled to the second LED module. The control module is coupled to the first power conversion module, the switch, and the second power conversion module. The control module conducts the switch for providing the second DC voltage and the third DC voltage are provided to the first LED module; the control module does not conduct the switch and controls the second power conversion module to provide a fourth DC voltage, a fifth DC voltage, and a sixth DC voltage according to the second DC voltage so as to provide the fourth DC voltage, the fifth DC voltage, and the sixth DC voltage are provided to the second LED module.

In order to solve the above-mentioned problems, the present disclosure provides a method of operating an LED driver. The LED driver is coupled to a first LED module and a second LED module, and the LED deriver includes a first power conversion module and a second power conversion module. The method includes steps of: (a) receiving a first DC voltage, (b) controlling the first power conversion module to convert the first DC voltage into a second DC voltage and a third DC voltage for providing the second DC voltage and the third DC voltage to the first LED module when the LED driver operates in a first working mode, and (c) controlling the second power conversion module to convert the second DC voltage into a fourth DC voltage, a fifth DC voltage, and a sixth DC voltage for providing the fourth DC voltage, the fifth DC voltage, and the sixth DC voltage to the second LED module when the LED driver operates in a second working mode.

Accordingly, the present disclosure can increase the efficiency of the power converter of the LED driver in different working modes, thereby achieving environmental protection and energy saving effects.

It is to be understood that both the foregoing general description and the following detailed description are exemplary, and are intended to provide further explanation of the present disclosure as claimed. Other advantages and features of the present disclosure will be apparent from the following description, drawings, and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
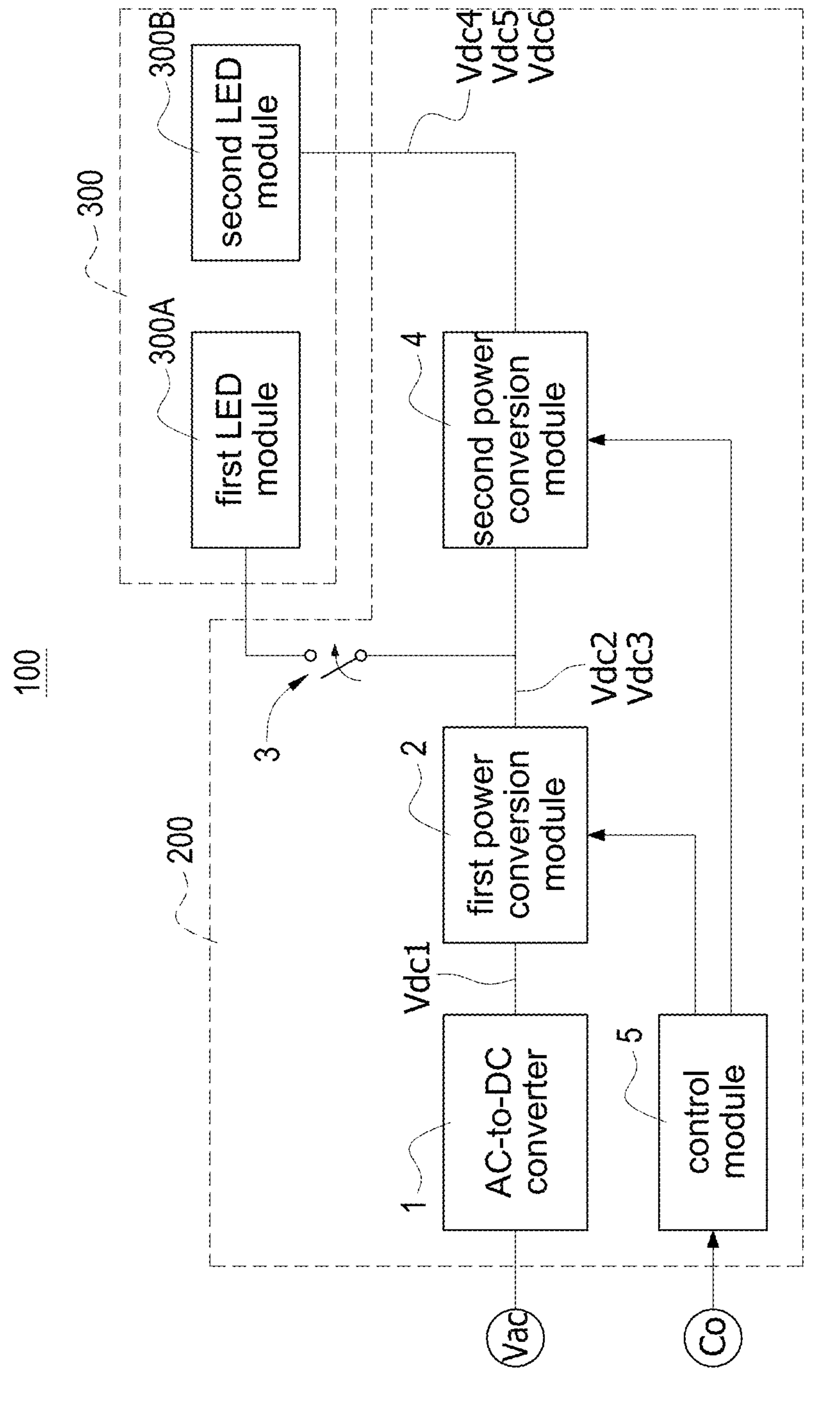
FIG. 1 is a block circuit diagram of a hybrid LED lamp according to the present disclosure.

Reference will now be made to the drawing figures to describe the present disclosure in detail. It will be understood that the drawing figures and exemplified embodiments of present disclosure are not limited to the details thereof.

Please refer to FIG. 1, which shows a block circuit diagram of a hybrid LED lamp according to the present disclosure. The hybrid LED (light-emitting diode) lamp 100 includes an LED driver 200 and an LED module 300. The LED driver 200 is coupled to an AC (alternating current) voltage Vac and the LED module 300. The AC voltage may be a sine wave with a voltage of 208 to 480 volts and a frequency of 50 to 60 Hz. The LED driver 200 includes an AC-to-DC (direct current) converter 1, a first power conversion module 2, a switch 3, a second power conversion module 4, and a control module 4. The LED module 300 includes a first LED module 300A and a second LED module 300B.

The AC-to-DC converter 1 is coupled to the AC voltage Vac, and converts the AC voltage Vac into a first DC voltage Vdc1. The first power conversion module 2 is coupled to the AC-to-DC converter 1 to generate one or more DC output voltages. In this embodiment, the first power conversion module 2 generates a second DC voltage Vdc2 and a third DC voltage Vdc3 according to the first DC voltage Vdc1. One terminal of the switch 3 is coupled to the first power conversion module 2, and the other terminal of the switch 3 is coupled to the first LED module 300A. The second power conversion module 4 is coupled to the first power conversion module 2 and the second LED module 300B. The control module 5 is coupled to the first power conversion module 2, the switch 3, and the second power conversion module 4, and controls the first power conversion module 2, the switch 3, and the second power conversion module 4 (by, for example, but not limited to, external commands or internal codes) so that the first LED module 300A and the second LED module 300B operate in the required working modes.

The control module 5 controls the first power conversion module 2 to generate the second DC voltage Vdc2 and the third DC voltage Vdc3 according to the first DC voltage Vdc1, and conducts the switch 3 to provide the second DC voltage Vdc2 and the third DC voltage Vdc3 to the first LED module 300A so that the first LED module 300A operates. The control module 5 does not conduct the switch 3, and controls the second power conversion module 4 to generate a fourth DC voltage Vdc4, a fifth DC voltage Vdc5, and the fourth DC voltage Vdc4, the fifth DC voltage Vdc5, and the sixth DC voltage Vdc6 are provided from the second power conversion module 4 to the second LED module 300B so that the second LED module 300B operates.

When a ratio between an output voltage and an input voltage of the power conversion module is too high or too low, its power conversion efficiency is usually poor. For example, when a pulse width modulation (PWM) signal is used to control a power conversion module for voltage conversion, if the ratio between the output voltage and the input voltage is too low, the pulse width modulation signal should use a smaller duty cycle, resulting in poor power conversion efficiency. Therefore, the LED driver 200 of the present disclosure improves the power conversion efficiency of the power conversion module by setting the ratios between the output voltages and the input voltages of the first power conversion module 2 and the second power conversion module 4 in a region with higher conversion efficiency (for example, about 0.5 times).

In one embodiment, a voltage value of the first DC voltage Vdc1 (for example, 780 volts) is greater than that of the second DC voltage Vdc2 and the third DC voltage Vdc3 (for example, 400 volts), and the voltage value of the second DC voltage Vdc2 is greater than that of the fourth DC voltage Vdc4, the fifth DC voltage Vdc5, and the sixth DC voltage Vdc6 (for example, 200 volts). Therefore, by setting the ratio between the first DC voltage Vdc1 and the second DC voltage Vdc2 (the third DC voltage Vdc3) and the ratio between the second DC voltage Vdc2 and the fourth DC voltage Vdc4 (the fifth DC voltage Vdc5 and the sixth DC voltage Vdc6) in a region with higher conversion efficiency, it can effectively increase the power conversion efficiency of the LED driver 200 in various working modes. In the above-mentioned embodiment, by setting the ratios between the output voltages and the input voltages of the first power conversion module 2 and the second power conversion module 4 to approximately 0.5 times, and therefore when the first power conversion module 2 and the second power conversion module 4 are controlled by the pulse-width modulation (PWM) signal, the duty cycle of the PWM signal will not be too low (for example, not less than 10%) to increase power conversion efficiency.

Refer to FIG. 1 again, the AC-to-DC converter 1 is a boost converter structure. In addition, in one embodiment, the AC voltage Vac is 480 volts (for example, an AC voltage of a line-to-line 480 volts of one phase of three-phase four-wire), and the AC-to-DC converter 1 may be an interleaved boost converter. In addition, in one embodiment, if a three-phase voltage input is used, the AC-to-DC converter 1 also adopts a suitable voltage conversion structure accordingly. In addition, the AC-to-DC converter 1 may also be used to perform functions such as power factor correction, for example, using a boost power factor correction converter (boost PFC convert), a Totem-Pole power factor correction converter (Totem-Pole PFC converter), a buck-boost power factor correction converter (buck-boost PFC converter), or other suitable AC-to-DC conversion structures.

Figure 2A:
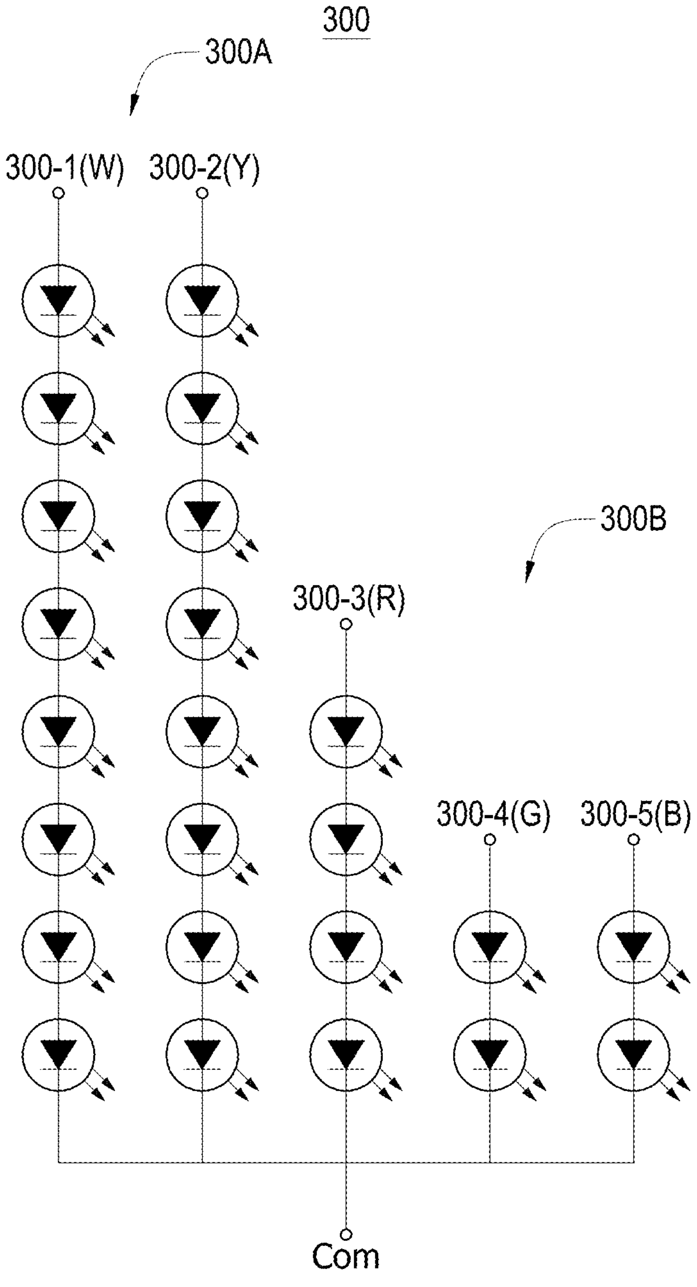
FIG. 2A is a block circuit diagram of an LED module shown in FIG. 1 according to one embodiment of the present disclosure.

Please refer to FIG. 2A, which shows a block circuit diagram of an LED module shown in FIG. 1 according to one embodiment of the present disclosure. The first LED module 300A includes a first color LED lamp assembly 300-1 and a second color LED lamp assembly 300-2. The second LED module 300B includes a third color LED lamp assembly 300-3, a fourth color LED lamp assembly 300-4, and a fifth color LED lamp assembly 300-5. Each color LED lamp assembly (W) may be implemented using a chip on board (COB) light module. In particular, the first LED module 300A may be a color temperature adjustment module that requires a higher operating voltage to drive more LED components to provide lighting functions. In one embodiment, the first color LED lamp assembly 300-1 and the second color LED lamp assembly 300-2 may be a white LED lamp assembly (W) and a yellow LED lamp assembly (Y) respectively. The second LED module 300B may be a color mixing adjustment module that requires only a lower operating voltage to drive fewer LED components to provide lighting effects. In one embodiment, the third color LED lamp assembly 300-3, the fourth color LED lamp assembly 300-4, and the fifth color LED lamp assembly 300-5 may be a red LED lamp assembly (R), a green LED lamp assembly (G), and a blue LED lamp assembly (B) respectively. In one embodiment, the white LED lamp assembly (W) is composed of eight white LED components connected in series. For example, the cross voltage of a single COB light module is 36 volts, and the cross voltage of the white LED lamp assembly is 36 volts*8-288 volts.

The yellow LED lamp assembly (Y) is composed of eight yellow LED components connected in series. If a 36-volt COB light module is used, the cross voltage of the yellow LED lamp assembly is 288 volts. Therefore, when using a 36-volt COB light module and a 2.1-ampere input current, the first LED module 300A will reach a power consumption of approximately 1200 watts, and the color temperature control of the first LED module 300A can be achieved through, for example, DALI DT-8(tc).

In one embodiment, the red LED lamp assembly (R) is composed of four red LED components connected in series, and if a 36-volt COB light module is used, the cross voltage of the red LED lamp assembly (R) is 144 volts. The green LED lamp assembly (G) is composed of two green LED components connected in series, and if a 36-volt COB light module is used, the cross voltage of the green LED lamp assembly (G) is 72 volts. The blue LED lamp assembly (B) is composed of two blue LED components connected in series, and if a 36-volt COB light module is used, the cross voltage of the blue LED lamp assembly (G) is 72 volts. Therefore, when using a 36-volt COB light module and a 2.1-ampere input current, the second LED module 300B generally reaches a power consumption of 600 watts, and the color mixing control of the second LED module 300B can be achieved through, for example, DALI DT-8(RGBWA).

At one terminal of each LED lamp assembly, it is usually a common connection structure connected to the same node Com. Since the white LED lamp assembly (W) and the yellow LED lamp assembly (Y) mainly provide lighting functions, the number of LED components connected in series in the internal lamp assembly of the first LED module 300A will be greater than the number of LED components connected in series in the internal lamp assembly of the second LED module 300B. However, depending on the application situation of a floodlight, the number of LED components connected in series in the internal lamp assembly of the first LED module 300A may be less than or equal to the number of LED components connected in series in the internal lamp assembly of the second LED module 300B. In one embodiment, the control module 5 controls only one of the first LED module 300A and the second LED module 300B operating at the same time. That is, when one of the first LED module 300A and the second LED module 300B operates, the other one does not operate (work). Therefore, when the first LED module 300A of 1200 watts is operating, the second LED module 300B of 600 watts stops operating, and vice versa.

The control module 5 may also control the first LED module 300A and the second LED module 300B to simultaneously operate under a preset output power limit. For example, the first LED module 300A and the second LED module 300B simultaneously operate, and the total power consumption of the two modules is set to be less than 1200 watts. In one embodiment, the control module 5 continuously controls the first power conversion module 2 to supply power to the first LED module 300A, and selectively controls the second power conversion module 4 to supply power to the second LED module 300B. Therefore, the control module 5 can adjust the color temperature of the hybrid LED lamp 100 at any time, and then selectively incorporate color-mixing control according to actual needs so that it can be determined according to the preset operating mode of the LED driver 200.

Figure 2B:
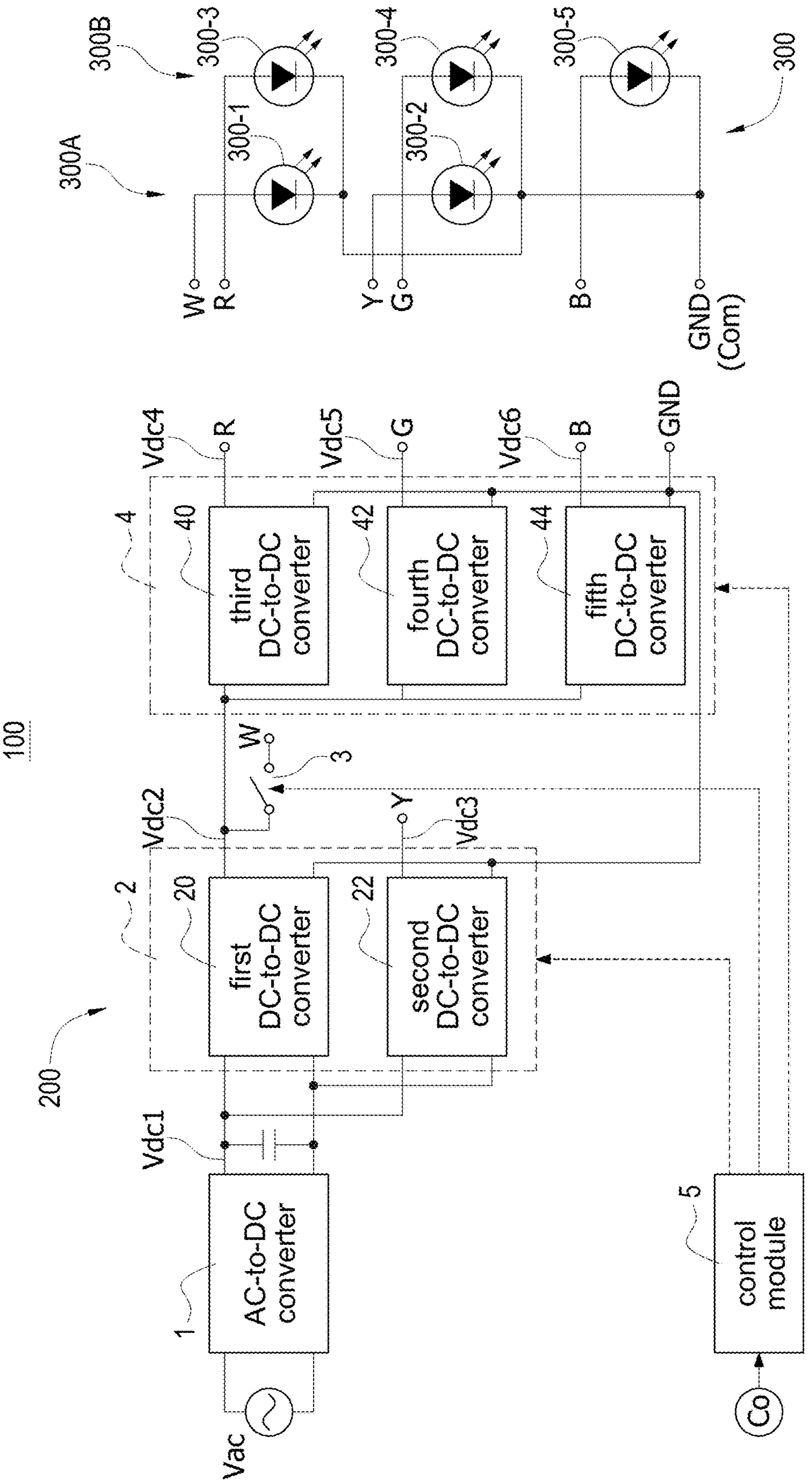
FIG. 2B is a block circuit diagram of the hybrid LED lamp according to a first embodiment of the present disclosure.

Please refer to FIG. 2B, which shows a block circuit diagram of the hybrid LED lamp according to a first embodiment of the present disclosure, and also refer to FIG. 1 to FIG. 2A. The first power conversion module 2 includes a first DC-to-DC converter 20 and a second DC-to-DC converter 22. An input terminal of the first DC-to-DC converter 20 and an input terminal of the second DC-to-DC converter 22 are coupled to the AC-to-DC converter 1. A first output terminal of the first DC-to-DC converter 20 is coupled to a first terminal of the switch 3 and an input terminal of the second power conversion module 4. A second terminal of the switch 3 is coupled to a first terminal of the first color LED lamp assembly 300-1. A second output terminal of the first DC-to-DC converter 20 and a second terminal of the first color LED lamp assembly 300-1 are grounded (i.e., connected to a ground potential GND). The two output terminals of the second D-to-/DC converter 22 are respectively used to couple the second color LED lamp assembly 300-2 and the ground potential GND, and the control module 5 is coupled to the first DC-to-DC converter 20, the second DC-to-DC converter 22, and the switch 3.

In a lighting working mode of the present disclosure, the LED driver 200 drives the first LED module 300A operating to provide a lighting function and has a color temperature adjustment function, and drivers the second LED module 300B to stop operating. In the lighting working mode, the control module 5 conducts the switch 3. The control module 5 controls the first DC-to-DC converter 20 to convert the first DC voltage Vdc1 into the second DC voltage Vdc2. The second DC voltage Vdc2 outputted from the first DC-to-DC converter 20 is provided to the first color LED lamp assembly 300-1 through the switch 3 so as to make the first color LED lamp assembly 300-1 operate. Furthermore, the control module 5 controls the second DC-to-DC converter 22 to convert the first DC voltage Vdc1 into the third DC voltage Vdc3. The third DC voltage Vdc3 outputted from the second DC-to-DC converter 22 is provided to the second color LED lamp assembly 300-2 so as to make the second color LED lamp assembly 300-2 operate. Therefore, the control module 5 can adjust the voltage and/or the current outputted from the first DC-to-DC converter 20 and/or the second DC-to-DC converter 22, i.e., adjust the brightness of the first color LED lamp assembly 300-1 and/or the second color LED lamp assembly 300-2 to achieve color temperature control. In this condition, the control module 5 controls the second power conversion module 4 to stop operating so that the second LED module 300B does not work. In addition, the control module 5 may also control only one of the first color LED lamp assembly and the second color LED lamp assembly 300-2 to operate according to the desired color temperature of the first LED module 300A.

In a color-mixing working mode of the present disclosure, the LED driver 200 drives the first LED module 300A to stop operating, and drives the second LED module 300B operating to provide a color-mixing function. In the color-mixing working mode, the control module 5 does not conduct the switch 3. The second DC voltage Vdc2 outputted from the first DC-to-DC converter 20 cannot be provided to the first color LED lamp assembly 300-1 through the switch 3, and therefore the first color LED lamp assembly 300-1 does not work. Furthermore, the control module 5 controls the second DC-to-DC converter 22 to stop operating so that the second color LED lamp assembly 300-2 does not work. Moreover, the second DC voltage Vdc2 outputted from the first DC-to-DC converter 20 is provided to the second power conversion module 4, and therefore the control module 5 controls the second power conversion module 4 to convert the second DC voltage Vdc2 so that the second LED module 300B operates to provide the color-mixing function.

The control module 5 can provide a variety of possible disabling methods. For example, the control module 5 does not provide a control signal so that the conversion module/converter cannot operate. Alternatively, the control module 5 can also disconnect the power supply path so that the conversion module/converter cannot receive the power supply and cannot operate. Therefore, according to the above-mentioned control methods, the switch 3 may be a three-terminal switch in addition to being the same as the embodiment in FIG. 2B. When it is necessary to supply power to the first LED module 300A, the switch 3 is switched to couple the first color LED lamp assembly 300-1 and the first DC-to-DC converter 20, and the first DC-to-DC converter 20 and second power conversion module 4 are disconnected. Therefore, the second DC voltage Vdc2 outputted from the first DC-to-DC converter 20 can be provided to the first color LED lamp assembly 300-1 through the switch 3, but cannot be provided to the second power conversion module 4 through the switch 3. On the contrary, when the switch S3 is switched to connect the first DC-to-DC converter 20 and the second power conversion module 4, and the first color LED lamp assembly 300-1 and the first DC-to-DC converter 20 are disconnected, the second DC voltage Vdc2 outputted from the first DC-to-DC converter 20 can be provided to the second power conversion module 4, but cannot be provided to the first color LED lamp assembly 300-1 through the switch 3.

Please refer to FIG. 2B again, in this embodiment, the second power conversion module 4 includes a third DC-to-DC converter 40, a fourth DC-to-DC converter 42, and a fifth DC-to-DC converter 44. An input terminal of the third DC-to-DC converter 40, an input terminal of the fourth DC-to-DC converter 42, and an input terminal of the fifth DC-to-DC converter 44 are coupled tot eh first DC-to-DC converter 20. A first output terminal of the third DC-to-DC converter 40, a first output terminal of the fourth DC-to-DC converter 42, and a first output terminal of the fifth DC-to-DC converter 44 are respectively coupled to a first terminal of a third color LED lamp assembly 300-3, a first terminal of a fourth color LED lamp assembly 300-4, and a first terminal of a fifth color LED lamp assembly 300-5. A second output terminal of the third DC-to-DC converter 40, a second output terminal of the fourth DC-to-DC converter 42, and a second output terminal of the fifth DC-to-DC converter 44 are coupled to the ground potential GND. A second terminal of the third color LED lamp assembly 300-3, a second terminal of the fourth color LED lamp assembly 300-4, and a second terminal of the fifth color LED lamp assembly 300-5 are coupled to the ground potential GND. The third DC-to-DC converter 40, the fourth DC-to-DC converter 42, and the fifth DC-to-DC converter 44 respectively convert the second DC voltage Vdc2 provided from the first DC-to-DC converter 20 into a fourth DC voltage Vdc4, a fifth DC voltage Vdc5, and a sixth DC voltage Vdc6 to supply power to the third color LED lamp assembly 300-3, the fourth color LED lamp assembly 300-4, and the fifth color LED lamp assembly 300-5.

In the color-mixing working mode, the control module 5 controls the third DC-to-DC converter 40 to convert the second DC voltage Vdc2 into the fourth DC voltage Vdc4, and the fourth DC voltage Vdc4 is provide to the third color LED lamp assembly 300-3 so that the third color LED lamp assembly 300-3 operates. The control module 5 controls the fourth DC-to-DC converter 42 and the fifth DC-to-DC converter 44 to respectively convert the second DC voltage Vdc2 into the fifth DC voltage Vdc5 and the sixth DC voltage Vdc6, and the fifth DC voltage Vdc5 and the sixth DC voltage Vdc6 are respectively provided to the fourth color LED lamp assembly 300-4 and the fifth color LED lamp assembly 300-5 so that the fourth color LED lamp assembly 300-4 and the fifth color LED lamp assembly 300-5 operate. Therefore, the control module 5 can adjust the voltage and/or the current outputted from the third DC-to-DC converter 40 and/or the fourth DC-to-DC converter 42, and/or the fifth DC-to-DC converter 44, i.e., adjust the brightness of the third color LED lamp assembly 300-3 and/or the fourth color LED lamp assembly 300-4, and/or the fifth color LED lamp assembly 300-5 to achieve color-mixing control. In addition, according to the color effect that the second LED module 300B wants to present, the control module 5 may also control one or more of the third color LED lamp assembly 300-3, the fourth color LED lamp assembly 300-4, and the fifth color LED lamp assembly 300-5 to simultaneously operate, that is, it is not necessary for all three to simultaneously operate.

Figure 3:
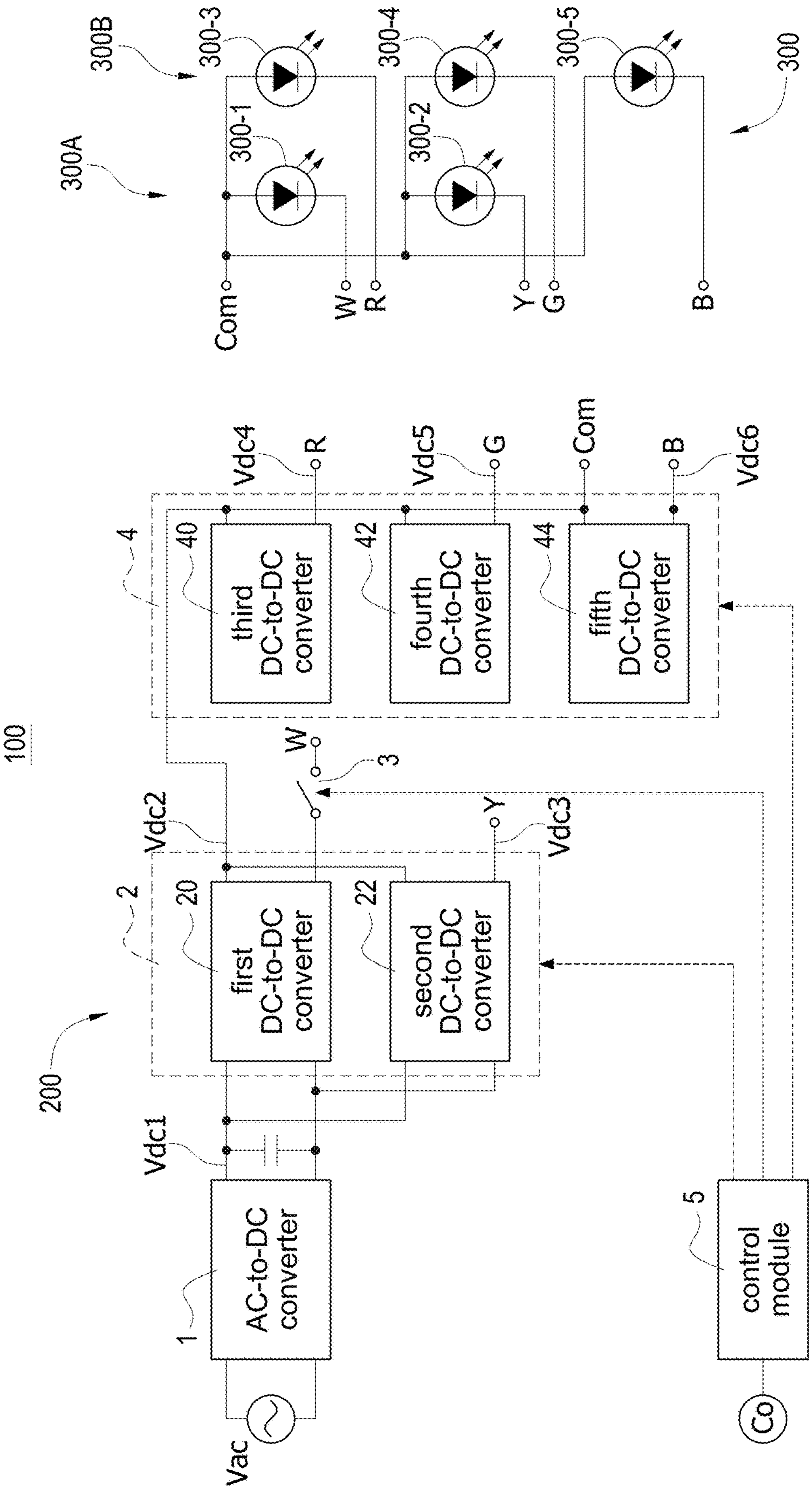
FIG. 3 is a block circuit diagram of the hybrid LED lamp according to a second embodiment of the present disclosure.

In the above-mentioned embodiment, the AC-to-DC converter 1 is a boost converter structure, and the first DC-to-DC converter 20 and the second DC-to-DC converter 22 are buck converter structures. In particular, the buck converter structure may be a buck converter or an inverse buck converter. In the embodiment of FIG. 2B, the first DC-to-DC converter 20 to the fifth DC-to-DC converter 44 are buck converters. Please refer to FIG. 3, which shows a block circuit diagram of the hybrid LED lamp according to a second embodiment of the present disclosure, and also refer to FIG. 1 to FIG. 2B. As shown in FIG. 3, the first DC-to-DC converter 20 to the fifth DC-to-DC converter 44 are inverse buck converters. In order to maintain the same reference potential of the first LED module 300A and the second LED module 300B, the first DC-to-DC converter to the fifth DC-to-DC converter 44 are all the same type of converters to simplify the circuit design. For example, all of them are buck converters or all of them are inverse buck converters. The circuit structure and operation mode not illustrated in FIG. 3 are similar to those in FIG. 2B, and will not be described again here.

Figure 4A:
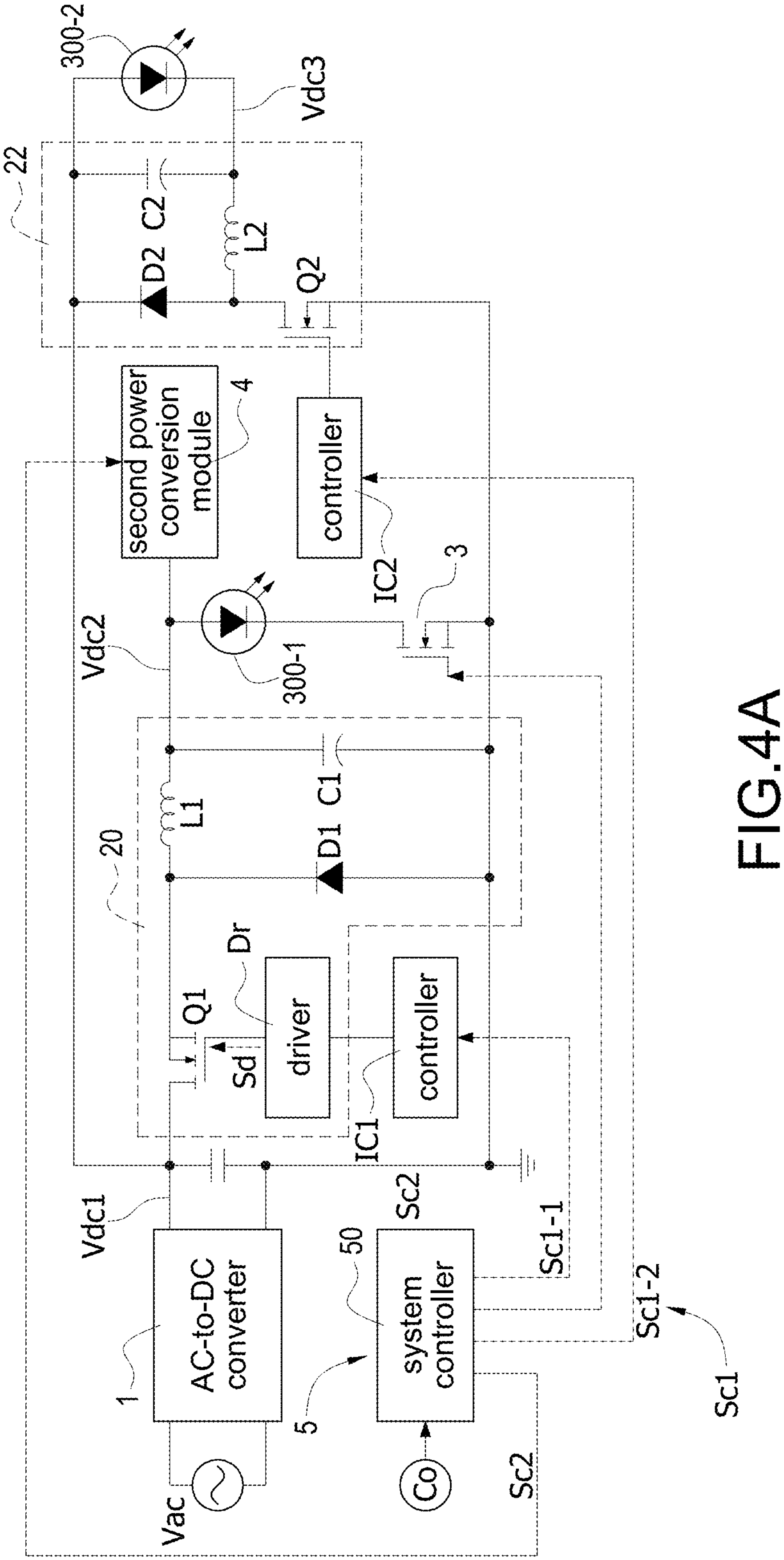
FIG. 4A is a partial circuit block diagram of the hybrid LED lamp according to one embodiment of the present disclosure.

In addition, the first DC-to-DC converter 20 to the fifth DC-to-DC converter 44 may also use different buck conversion structures respectively. Please refer to FIG. 4A, which shows a partial circuit block diagram of the hybrid LED lamp according to one embodiment of the present disclosure, and also refer to FIG. 1 to FIG. 3. In FIG. 4A, the first DC-to-DC converter 20 is a buck converter. The first DC-to-DC converter 20 includes a power switch Q1, a diode D1, an inductor L1, a capacitor C1, and a driver Dr. A first terminal of the power switch Q1 is coupled to a positive terminal of a DC bus of the AC-to-DC converter 1. A first terminal of the inductor L1 is coupled to a second terminal of the power switch Q1 and a first terminal of the diode D1, and a second terminal of the inductor L1 is coupled to a first terminal of the capacitor C1. The first terminal and a second terminal of the capacitor C1 are coupled to two output terminals of the first DC-to-DC converter 20, i.e., the first terminal and the second terminal of the capacitor C1 are used as the two output terminals of the first DC-to-DC converter 20. A first output terminal of the first DC-to-DC converter 20 is coupled to a first terminal of the first color LED lamp assembly 300-1 and the second power conversion module 4, a second output terminal of the first DC-to-DC converter 20 is coupled to the first terminal of the switch 3, and the second terminal of the switch 3 is coupled to a second terminal of the first color LED lamp assembly 300-1. An output terminal of the driver Dr is coupled to a control terminal of the switch Q1 to control the switch Q1 to be conducted or not conducted.

In FIG. 4A, the second DC-to-DC converter 22 is an inverse buck converter, and the second DC-to-DC converter 22 includes a power switch Q2, a diode D2, an inductor L2, and a capacitor C2. A second terminal of the power switch Q2 is coupled to the second output terminal of the first DC-to-DC converter 20 and the first terminal of the switch 3. A first terminal of the inductor L2 is coupled to a first terminal of the power switch Q2 and a first terminal of the diode D2, and a second terminal of the inductor L2 is coupled to a first terminal of the capacitor C2. The second terminal of the power switch Q2 is coupled to a negative terminal of the DC bus of the AC-to-DC converter 1, and a second terminal of the diode D2 is coupled to the positive terminal of the DC bus of the AC-to-DC converter 1. The first terminal and a second terminal of the capacitor C2 are coupled to two output terminals of the second DC-to-DC converter 22, i.e., the first terminal and the second terminal of the capacitor C2 are used as the two output terminals of the second DC-to-DC converter 22, and the two output terminals of the second DC-to-DC converter 22 are coupled to the second color LED lamp assembly 300-2. Since the first DC-to-DC converter 20 is the buck converter and the second DC-to-DC converter 22 is the inverse buck converter, a common node of circuit components in the first color LED lamp assembly 300-1 is the negative terminal of the DC bus of the AC-to-DC converter 1 (for example, the ground potential), and a common node of circuit components in the second color LED lamp assembly 300-2 is the positive terminal of the DC bus of the AC-to-DC converter 1.

The control module 5 may also be implemented by of one or more circuit components. For example, as shown in FIG. 4A, the control module 5 includes a system controller 50, a first control module, and a second control module. The system controller 50 provides a first control signal assembly Sc1 and a second control signal assembly Sc2, and the first control module and the second control module are coupled to the system controller 50. The first control module controls the first power conversion module 2 according to the first control signal assembly Sc1, and the second control module controls the second power conversion module 4 according to the second control signal assembly Sc2. In one embodiment, the first control module includes a controller IC1 of controlling the first DC-to-DC converter 20 and a controller IC2 of controlling the second DC-to-DC converter 22. The controller IC1 of controlling the first DC-to-DC converter 20 is coupled to an input terminal of the driver Dr. The controller IC1 receives a control signal Sc1-1 of the first control signal assembly Sc1 to control the driver Dr driving the switch Q1 according to the control signal Sc1-1 so as to control the first DC-to-DC converter 20 to convert the first DC voltage Vdc1 into the second DC voltage Vdc2. The controller IC2 of controlling the second DC-to-DC converter 22 is coupled to a control terminal of the switch Q2. The controller IC2 receives a control signal Sc1-2 of the first control signal assembly Sc1 to control the switch Q2 according to the control signal Sc1-2 so as to control the second DC-to-DC converter 22 to convert the first DC voltage Vdc1 into the third DC voltage Vdc3.

Since the power switch Q1 of the first DC-to-DC converter 20 (buck converter) is connected to the positive terminal of the DC bus, the received voltage (i.e., the first DC voltage Vdc1) is relatively high. Therefore, if the controller IC1 wants to conduct the power switch Q1, it must provide a driving signal Sd with a higher voltage value through the driver Dr coupled to the control terminal of the switch Q1 so as to successfully conduct the power switch Q1. Since the power switch Q2 of the second DC-to-DC converter 22 (invert buck converter) is connected to the negative terminal of the DC bus, it belongs to a ground loop. Therefore, the controller IC2 does not need to use the driver Dr to provide the driving signal Sd with a higher voltage value to control the power switch Q2 to conduct. Therefore, the inverse buck converter does not need to use the driver Dr and can directly conduct the power switch Q2 according to the control signal Sc1-2.

In one embodiment, the AC-to-DC converter 1 may be controlled by directly providing a control signal from the system controller 50 to control the AC-to-DC converter 1 to convert the AC voltage Vac into the first DC voltage Vdc1. In addition, the AC-to-DC converter 1 may also provide a control signal from the system controller 50 to a controller (not shown) inside the AC-to-DC converter 1 so that the controller inside the AC-to-DC converter 1 then controls the AC-to-DC converter 1 to convert the AC voltage Vac into the first DC voltage Vdc1 according to the received control signal.

Figure 4B:
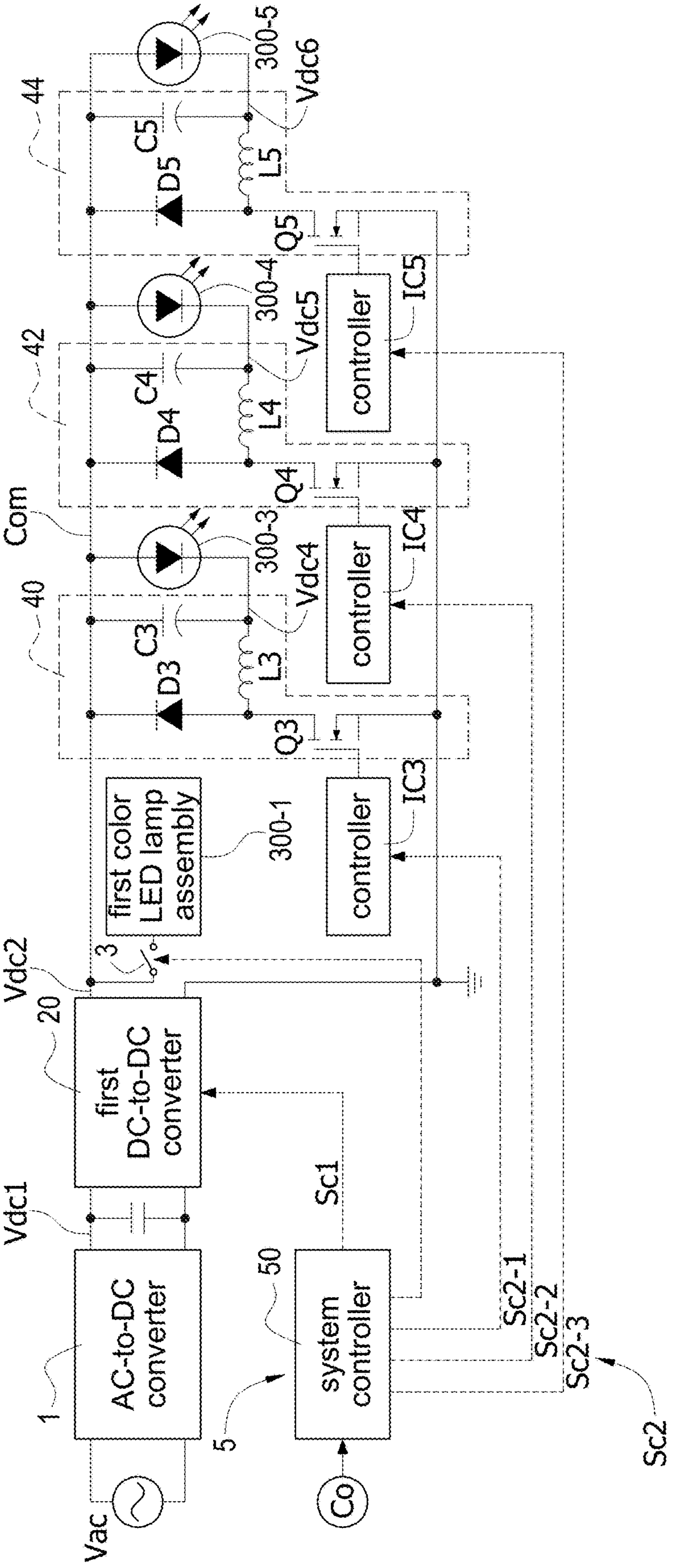
FIG. 4B is a partial circuit block diagram of the hybrid LED lamp according to one embodiment of the present disclosure.

Please refer to FIG. 4B, which shows a partial circuit block diagram of the hybrid LED lamp according to one embodiment of the present disclosure, and also refer to FIG. 1 to FIG. 4A. In the embodiment of FIG. 4B, the third DC-to-DC converter 40, the fourth DC-to-DC converter 42, and the fifth DC-to-DC converter 44 are inverse buck converters, and its structure is similar to the second DC-to-DC converter 22 in FIG. 4A, and its detailed structure will not be described in detail here. An input terminal of the third DC-to-DC converter 40, an input terminal of the fourth DC-to-DC converter 42, and an input terminal of the fifth DC-to-DC converter 44 are coupled to the first output terminal of the first DC-to-DC converter 20 to receive the second DC voltage Vdc2. An output terminal of the third DC-to-DC converter 40, an output terminal of the fourth DC-to-DC converter 42, and an output terminal of the fifth DC-to-DC converter 44 are respectively coupled to the third color LED lamp assembly 300-3, the fourth color LED lamp assembly 300-4, and the fifth color LED lamp assembly 300-5. The third color LED lamp assembly 300-3, the fourth color LED lamp assembly 300-4, and the fifth color LED lamp assembly 300-5 have a common positive-polarity structure connected to the same node Com.

Similar to FIG. 4A, the second control module includes a controller IC3 of controlling the third DC-to-DC converter 40, a controller IC4 of controlling the fourth DC-to-DC converter 42, and a controller IC5 of controlling the fifth DC-to-DC converter 44. The controller IC3, the controller IC4, and the controller IC5 are respectively coupled to a control terminal of the switch Q3, a control terminal of the switch Q4, and a control terminal of the switch Q5. The controller IC3, the controller IC4, and the controller IC5 respectively control the third DC-to-DC converter 40, the fourth DC-to-DC converter 42, and the fifth DC-to-DC converter 44 according to a control signal Sc2-1, a control signal Sc2-2, and a control signal Sc2-3. The controller IC3, the controller IC4, and the controller IC5 respectively convert the second DC voltage Vdc2 into the fourth DC voltage Vdc4, the fifth DC voltage Vdc5, and the DC voltage Vdc6 by conducting and not conducting the switch Q3, the switch Q4, and the switch Q5. Please refer to FIG. 4A again, since the third DC-to-DC converter 40, the fourth DC-to-DC converter 42, and the fifth DC-to-DC converter 44 are inverse buck converters, when the first DC-to-DC converter 20 to the fifth DC-to-DC converter 44 are all reverse buck converters, the first color LED lamp assembly 300-1 to the fifth color LED lamp assembly 300-5 may be commonly connected at the same node Com to simplify the design.

In one embodiment, the first control signal assembly Sc1 and the second control signal assembly Sc2 provided by the system controller 50 may also be processed by appropriate logic to control the second DC-to-DC converter 22, the fourth DC-to-DC converter 42, and the fifth DC-to-DC converter 42 not to operate, and there are a variety of operational methods that can be used to disable functions, and will not be described again here.

Figure 5:
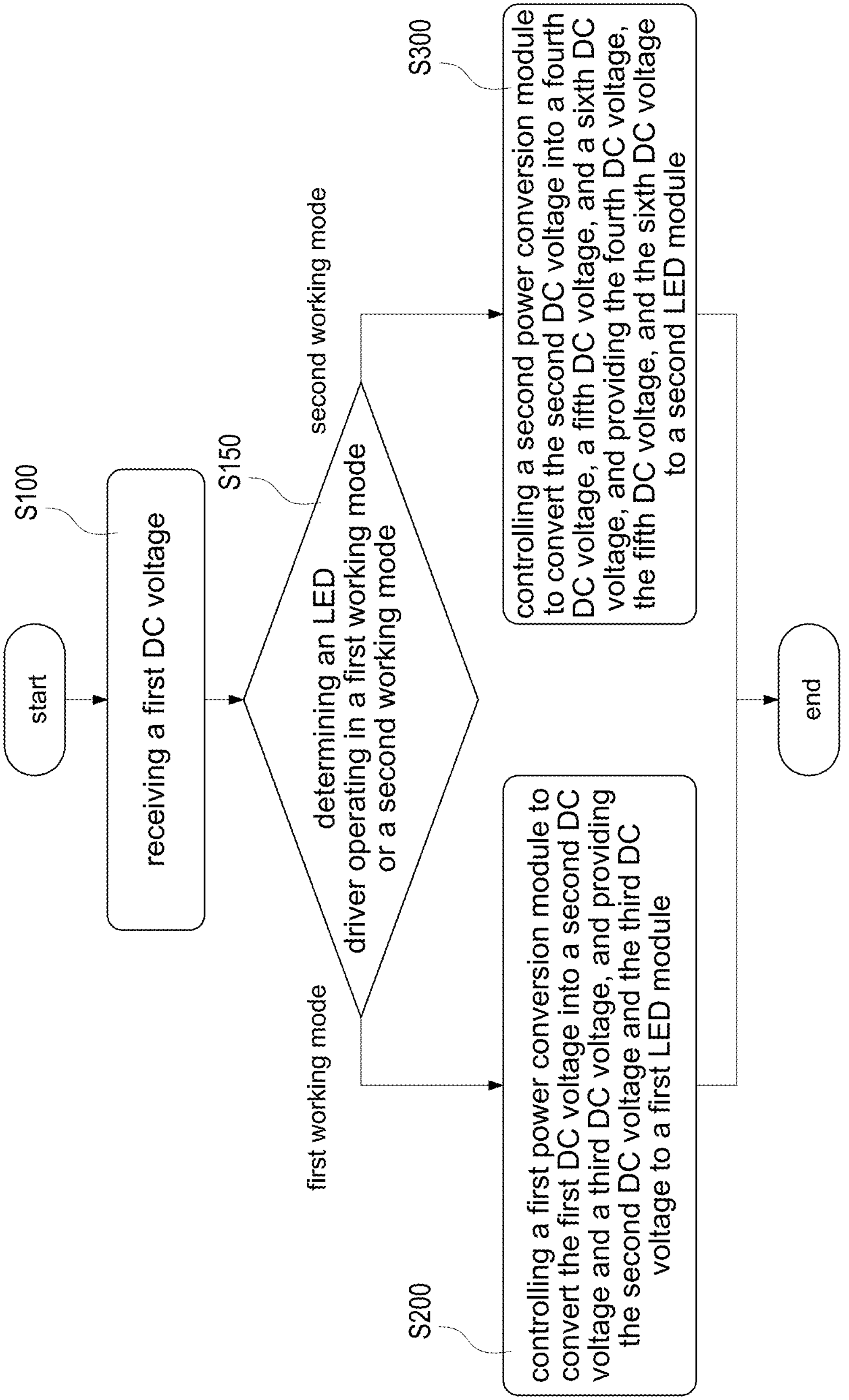
FIG. 5 is a flowchart of a method of operating the LED driver according to the present disclosure.

Please refer to FIG. 5, which shows a flowchart of a method of operating the LED driver according to the present disclosure, and also refer to FIG. 1 to FIG. 4B. The method of operating the hybrid LED driver is to provide a DC voltage to the first power conversion module 2 and the second power conversion module 4 in a power conversion mode with a more efficient output/input voltage ratio (for example, 0.5 times) by operating the hybrid LED driver 200. Therefore, the LED driver 200 can no longer have a situation where the conversion efficiency of the power conversion module is insufficient due to the extremely large difference in the output/input voltage ratio. Therefore, the method of operating the hybrid LED driver includes steps of: in step S100, receiving a first DC voltage, for example, an AC-to-DC converter 1 receives an AC voltage Vac, and converts the AC voltage Vac into the first DC voltage Vdc1.

In step S150, determining whether the LED driver operates in a first working mode or a second working mode. A control module 5 may receive external commands Co externally provided or internal codes to determine whether the LED driver 20 operates in the first working mode or the second working mode. For example, the first working mode is a lighting working mode (or called a color temperature working mode), and the second working mode is a color-mixing working mode. When the LED driver 200 determines that the LED driver 200 operates in the first working mode, step S200 is executed, and when the LED driver 200 determines that the LED driver 200 operates in the second working mode, step S300 is executed.

In step S200, controlling the first power conversion module to convert the first DC voltage into a second DC voltage and a third DC voltage, and providing the second DC voltage and the third DC voltage to the first LED module. When the control module 5 determines that the LED driver 200 operating in the first working mode, the control module 5 controls the first power conversion module 2 to convert the first DC voltage Vdc1 into the second DC voltage Vdc2 and the third DC voltage Vdc3, and the second DC voltage Vdc2 and the third DC voltage Vdc3 are provided to the first LED module 300A. Moreover, in the lighting working mode, the control module 5 controls one of the first LED module 300A and the second LED module 300B to operate, and the other one will not operate. Therefore, when the control module 5 controls the first power conversion module 2 to provide the second DC voltage Vdc2 and the third DC voltage Vdc3 to the first LED module 300A, the control module 5 will make the second LED module 300B not operate.

In step S300, controlling the second power conversion module to convert the second DC voltage into a fourth DC voltage, a fifth DC voltage, and a sixth DC voltage, and providing the fourth DC voltage, the fifth DC voltage, and the sixth DC voltage to the second LED module. When control module 5 determines that the LED driver 200 operates in the second working mode, the control module 5 controls the second power conversion module 4 to convert the second DC voltage Vdc2 into the fourth DC voltage Vdc4, the fifth DC voltage Vdc5, and the sixth DC voltage Vdc6, and the fourth DC voltage Vdc4, the fifth DC voltage Vdc5, and the sixth DC voltage Vdc6 are provided to the second LED module 300B. When the control module 5 controls the second power conversion module 4 to provide the fourth DC voltage Vdc4, the fifth DC voltage Vdc5, and the sixth DC voltage Vdc6 to the second LED module 300B, the control module 5 will make the first LED module 300A not operate.

In one embodiment, whether the first DC-to-DC converter 20 and the first color LED lamp assembly 300-1 are conducted or not cannot only be implemented by the switch 3 shown in FIG. 2B and FIG. 3. For example, a three-contact switch may be coupled to the first DC-to-DC converter 20, the first color LED lamp assembly 300-1, and the second power conversion module 4 respectively so that only one path can be connected at a time. Therefore, there are many manners to implements such connections and disconnections, and its descriptions will not be described in detail here.

In the above embodiments, the colors of the first, the second, the third, the fourth and the fifth color LED lamp assemblies may be respectively configured to be the same or different. For example, the colors may be respectively configured to be visible or non-visible light (e.g., infrared light, ultraviolet light). Moreover, the first LED module may comprise only the first color LED lamp assembly and/or the second LED module may comprise some of the third, the fourth and the firth color LED lamp assemblies. For example, in a plant grow light system, the first and the second color LED lamp assemblies may be both realized with red light LED lamp assemblies, the third and the fourth color LED lamp assemblies may be respectively realized with a blue light LED lamp assembly and an infrared light LED lamp assembly, and there is no the fifth color LED lamp assembly.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. An LED driver, configured to be coupled to a first LED module and a second LED module, comprising:

a first power conversion module configured to convert a first DC voltage into a second DC voltage and a third DC voltage, a switch coupled to the first power conversion module, and configured to be coupled to the first LED module, a second power conversion module coupled to the first power conversion module, and configured to be coupled to the second LED module, and a control module coupled to the first power conversion module, the switch, and the second power conversion module, wherein the control module is configured to conduct the switch for providing the second DC voltage and the third DC voltage to the first LED module; the control module is configured to not conduct the switch and controls the second power conversion module to provide a fourth DC voltage, a fifth DC voltage, and a sixth DC voltage according to the second DC voltage so as to provide the fourth DC voltage, the fifth DC voltage, and the sixth DC voltage to the second LED module.

2. The LED driver as claimed in claim 1, wherein the first LED module comprises a first color LED lamp assembly and a second color LED lamp assembly, and the first power conversion module comprises:

a first DC-to-DC converter coupled to an AC-to-DC converter for receiving the first DC voltage, and coupled to the first color LED lamp assembly through the switch, and a second DC-to-DC converter coupled to the AC-to-DC converter for receiving the first DC voltage, and coupled to the second color LED lamp assembly, wherein the control module is configured to conduct the switch so that the second DC voltage outputted from the first DC-to-DC converter is provided to the first color LED lamp assembly through the switch.

3. The LED driver as claimed in claim 2, wherein the control module conducts the switch when the LED driver operates in a first working mode, and controls the second DC-to-DC converter to convert the first DC voltage into the third DC voltage so that the third DC voltage is provided to the second color LED lamp assembly for the second color LED lamp assembly to work accordingly.

4. The LED driver as claimed in claim 2, wherein the control module does not conduct the switch when the LED driver operates in a second working mode so that the first color LED lamp assembly does not work, and disables the second DC-to-DC converter so that the second color LED lamp assembly does not work.

5. The LED driver as claimed in claim 2, wherein the second LED module comprises a third color LED lamp assembly, a fourth color LED lamp assembly, and a fifth color LED lamp assembly, and the second power conversion module comprises:

a third DC-to-DC converter coupled to the first DC-to-DC converter and the third color LED lamp assembly for converting the second DC voltage provided from the first DC-to-DC converter into the fourth DC voltage, a fourth DC-to-DC converter coupled to the first DC-to-DC converter and the fourth color LED lamp assembly for converting the second DC voltage provided from the first DC-to-DC converter into the fifth DC voltage, a fifth DC-to-DC converter coupled to the first DC-to-DC converter and the fifth color LED lamp assembly for converting the second DC voltage provided from the first DC-to-DC converter into the sixth DC voltage, wherein the third DC-to-DC converter, the fourth DC-to-DC converter, and the fifth DC-to-DC converter are configured to respectively provide the fourth DC voltage, the fifth DC voltage, and the sixth DC voltage to the third color LED lamp assembly, the fourth color LED lamp assembly, and the fifth color LED lamp assembly.

6. The LED driver as claimed in claim 5, wherein the control module conducts the switch when the LED driver operates in a first working mode, and disables the third DC-to-DC converter, the fourth DC-to-DC converter, and the fifth DC-to-DC converter so that the third color LED lamp assembly, the fourth color LED lamp assembly, and the fifth color LED lamp assembly do not work.

7. The LED driver as claimed in claim 5, wherein the control module does not conduct the switch when the LED driver operates in a second working mode so that the first color LED lamp assembly does not work, and disables the second DC-to-DC converter so that the second color LED lamp assembly does not work.

8. The LED driver as claimed in claim 5, wherein the first DC-to-DC converter, the second DC-to-DC converter, the third DC-to-DC converter, the fourth DC-to-DC converter, and the fifth DC-to-DC converter are inverse buck converters.

9. The LED driver as claimed in claim 1, further comprising:

an AC-to-DC converter configured to convert an AC voltage into the first DC voltage.

10. The LED driver as claimed in claim 9, wherein the AC-to-DC converter comprises an interleaved boost converter, and the first power conversion module comprises at least one of a buck converter and an inverse buck converter.

11. A method of operating an LED driver, wherein the LED driver is coupled to a first LED module and a second LED module and comprises a first power conversion module and a second power conversion module, comprising steps of:

(a) receiving a first DC voltage, (b) controlling the first power conversion module to convert the first DC voltage into a second DC voltage and a third DC voltage for providing the second DC voltage and the third DC voltage to the first LED module when the LED driver operates in a first working mode, and (c) controlling the second power conversion module to convert the second DC voltage into a fourth DC voltage, a fifth DC voltage, and a sixth DC voltage for providing the fourth DC voltage, the fifth DC voltage, and the sixth DC voltage to the second LED module when the LED driver operates in a second working mode.

12. The method of operating the LED driver as claimed in claim 11, wherein the first LED module comprises a first color LED lamp assembly and a second color LED lamp assembly; the first power conversion module comprises a first DC-to-DC converter and a second DC-to-DC converter; and the step (b) further comprises steps of:

(b1) connecting the first DC-to-DC converter and the first color LED lamp assembly, controlling the first DC-to-DC converter to convert the first DC voltage into the second DC voltage for providing the second DC voltage to the first color LED lamp assembly, (b2) controlling the second DC-to-DC converter to convert the first DC voltage into the third DC voltage for providing the third DC voltage to the second color LED lamp assembly, and (b3) disabling the second power conversion module so as not to provide the fourth DC voltage, the fifth DC voltage, and the sixth DC voltage.

13. The method of operating the LED driver as claimed in claim 12, wherein the second LED module comprises a third color LED lamp assembly, a fourth color LED lamp assembly, and a fifth color LED lamp assembly; the second power conversion module comprises a third DC-to-DC converter, a fourth DC-to-DC converter, and a fifth DC-to-DC converter; and the step (c) further comprises steps of:

(c1) disconnecting the first DC-to-DC converter and the first color LED lamp assembly, and disabling the second DC-to-DC converter so that the second DC-to-DC converter does not provide the second DC voltage, (c2) controlling the third DC-to-DC converter to convert the second DC voltage into the fourth DC voltage for providing the fourth DC voltage to the third color LED lamp assembly, (c3) controlling the fourth DC-to-DC converter to convert the second DC voltage into the fifth DC voltage for providing the fifth DC voltage to the fourth color LED lamp assembly, and (c4) controlling the fifth DC-to-DC converter to convert the second DC voltage into the sixth DC voltage for providing the sixth DC voltage to the fifth color LED lamp assembly.

* * * * *